United States Patent
Yadav

(10) Patent No.: US 10,467,673 B2
(45) Date of Patent: Nov. 5, 2019

(54) METHOD, SYSTEM AND MEDIUM FOR MULTI-LANGUAGE CLASSIFICATION IN A SEARCH QUERY SYSTEM

(71) Applicant: DELL PRODUCTS, LP, Round Rock, TX (US)

(72) Inventor: Jagdish U. Yadav, Austin, TX (US)

(73) Assignee: Dell Products, LP, Round Rock, TX (US)

(*) Notice: Subject to any disclaimer, the term of this patent is extended or adjusted under 35 U.S.C. 154(b) by 433 days.

(21) Appl. No.: 15/054,929

(22) Filed: Feb. 26, 2016

(65) Prior Publication Data

US 2017/0249683 A1    Aug. 31, 2017

(51) Int. Cl.
```
G06Q 30/00      (2012.01)
G06Q 30/06      (2012.01)
G06F 16/2455    (2019.01)
G06F 16/33      (2019.01)
G06F 16/2453    (2019.01)
```

(52) U.S. Cl.
CPC ..... *G06Q 30/0625* (2013.01); *G06F 16/2455* (2019.01); *G06F 16/24534* (2019.01); *G06F 16/3344* (2019.01)

(58) Field of Classification Search
CPC .......... G06Q 30/0625; G06F 17/30477; G06F 17/30684
USPC ........................................................ 705/26.62
See application file for complete search history.

(56) References Cited

U.S. PATENT DOCUMENTS

| | | | | |
|---|---|---|---|---|
| 6,988,077 B1* | 1/2006 | Walker | ............... | G06Q 10/02 705/14.35 |
| 7,254,570 B2 | 8/2007 | Stickler | | |
| 9,229,974 B1* | 1/2016 | Lee | ................... | G06F 16/35 |
| 2013/0006954 A1* | 1/2013 | Nikoulina | ........... | G06F 17/2818 707/706 |
| 2014/0372257 A1* | 12/2014 | Nishioka | ............ | G06Q 30/0627 705/26.63 |
| 2015/0052115 A1* | 2/2015 | Sharifi | ............... | G06Q 30/0631 707/722 |

OTHER PUBLICATIONS

Searching service repositories by combining semantic and ontological matching (Year: 2005).*

* cited by examiner

*Primary Examiner* — Jeffrey A. Smith
*Assistant Examiner* — Lalith M Duraisamygurusamy
(74) *Attorney, Agent, or Firm* — Larson Newman, LLP

(57) ABSTRACT

A query handling system includes a product information database and a linguistic pipeline module. The pipeline module receives a query, determines that the query includes a first query term associated with a first product, wherein the first product is identified by a first product code, substitutes the first product code for the first query term in a first intermediate query, and searches the product information database based upon the first product code.

18 Claims, 4 Drawing Sheets

METHOD, SYSTEM AND MEDIUM FOR MULTI-LANGUAGE CLASSIFICATION IN A SEARCH QUERY SYSTEM

FIELD OF THE DISCLOSURE

This disclosure generally relates to information handling systems, and more particularly relates to multi-language classification in a search query system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A query handling system can include a product information database and a linguistic pipeline module. The pipeline module can receive a query, determine that the query includes a first query term associated with a first product where the first product is identified by a first product code, substitute the first product code for the first query term in a first intermediate query, and search the product information database based upon the first product code.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein, and will focus on specific implementations and embodiments of the teachings. This focus is provided to assist in describing the teachings, and should not be interpreted as limiting the scope or applicability of the teachings. Moreover, other teachings can be used along with the teachings of this disclosure, and the teachings of this disclosure can be used along with other disclosures.

Figure 1:
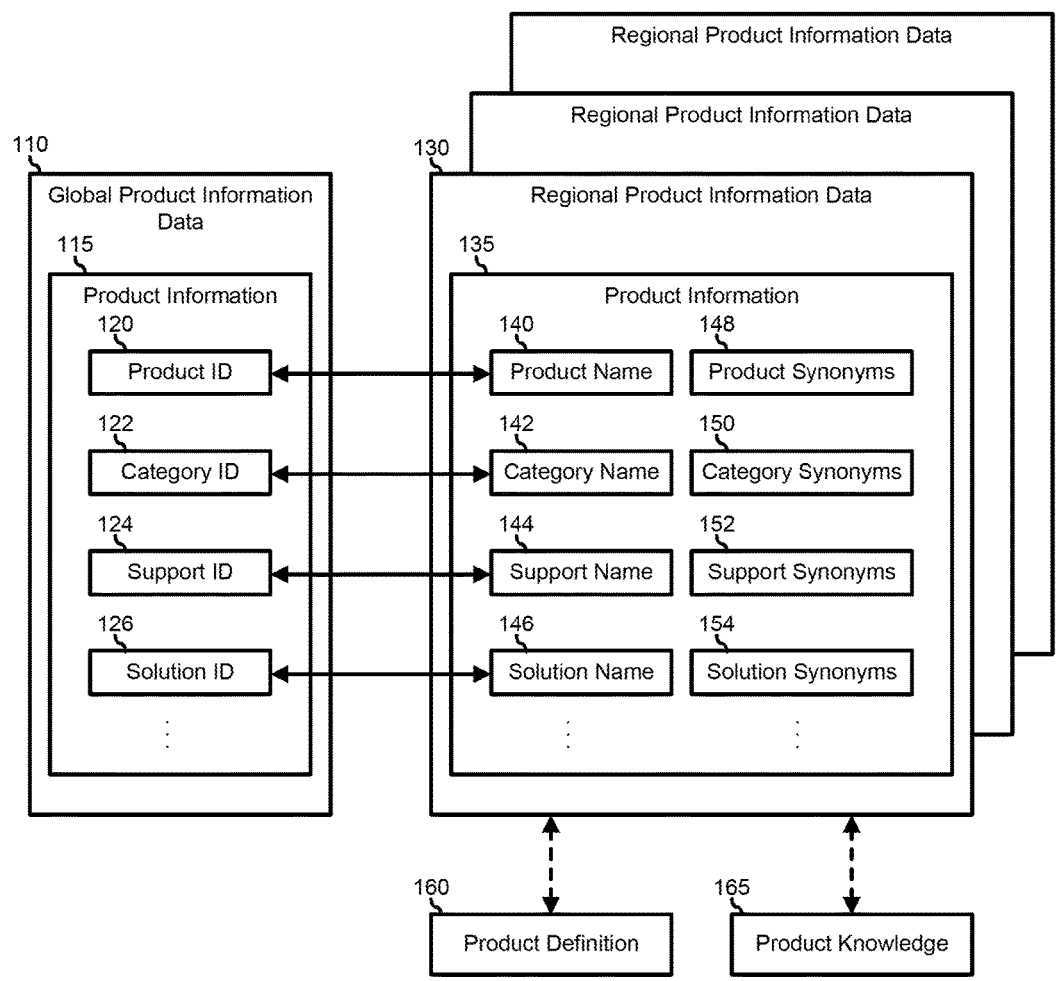
FIG. 1 is a block diagram of a product description database according to an embodiment of the present disclosure.

FIG. 1 illustrates a product description database 100, including global product information data 110, and one or more sets of regional product information data 130. Product description database 100 represents information related to a set of products and services that are offered by an entity and that are searchable by prospective users of the products and services. For example, product description database 100 can include information related to a specific type of product or service, such as computer related products and services, automotive products and services, household products and services, or other specific types of products and services. Further, product description database 100 can include information related to a more a broad array of products and services, such as may be provided by a general merchant.

Global product information data 110 includes product information 115 that is associated with a particular product or service offered by the particular entity, and that is uniquely ascribed to the particular product or service, such that the information included in the product information completely defines the particular product or service. Product information 115 includes a product identification 120, a category identification 122, a support identification 124, and a solution identification. Product identification 120 uniquely represents the particular product or service. An example of product information 120 include a part number for a particular product or service. Category identification 122 represents a category associated with the particular product. For example, category information 122 can describe a general category into which the particular product or service is included, such as an indication that a product described by product information 120 is a laptop computer, a desktop computer, a server rack, or another product category where product description database 100 is related to computer products and services.

Support identification 124 represents one or more items of information that define support item types that are associated with the product or service. For example, where the product identified by product identification 120 is a laptop computer, different support identifications 124 can include information that uniquely identify a driver for the laptop computer, an operating system for the laptop computer, a specification data sheet for the laptop computer, a Frequently Asked Questions page associated with the laptop computer, and the like. Solution identification 126 represents one or more items of information that defines solution types that are associated with the product or service. Thus, again, where the product associated with product information 115 is a laptop computer, support identification 126 can indicate whether the laptop computer is a ruggedized laptop computer, a gaming laptop computer, a business laptop computer, or the like.

Global product information data 110 should be understood to include other product information similar to product information 115, and that the information included in the other product information completely defines the other particular products or services. Global product information data 110 is searchable, such that a purchaser or user can obtain information related to the product associated with product information 115. For example, where a user knows a product identification for a particular product or service, the user can search global product information data 110 using the product identification to find out the associated category identification, support identification, and solution identification. Further note that product information 115 can include additional identification information that further defines the product or service. For example, product information 115 can include manufacturer identification information, accessory identification information, pricing identification information, purchasing deals information, and the like, as needed or desired.

Regional product information data 130 includes product information 135 that is associated with product information 115 of global product information data 110, and that is describes in a particular language the particular product or service associated with product information 115. Product information 135 includes one or more product name 140 and an associated list of product name synonyms 148, one or more category name 142 and an associated list of category name synonyms 150, one or more support name 144 and an associated list of support name synonyms 152, and one or more solution name 146 and an associated list of solution name synonyms 154.

Product name 140 represents a linguistic appellation or title for the particular product or service that is uniquely associated with product identification 120. Thus product name 140 can include a marking name or brand, a trade name, or the like. For example, where the product associated with product information 120 is a particular laptop, product name 140 can be "Inspirion." Product name synonyms 148 represent synonyms for product name 140. For example, product name synonyms 148 can include "Insperion Laptop," "Insperion 2-in-One," "Insperion Series 4," "Inspirion Extreme," or the like, where all of the product names refer to the product associated with product identifier 120. Category name 142 represents a linguistic appellation or title for the category associated with category identification 122, and category name synonyms 150 represent synonyms for category name 142. Similarly, support name 144 represents a linguistic appellation or title for support identification 124, and support name synonyms 152 represent synonyms for support name 144, and solution name 146 represents a linguistic appellation or title for solution identifier 126, and support name synonyms 154 represent synonyms for support name 146.

Product description database 100 may include one or more additional regional product information data similar to regional product information data 130. Here, the different regional product information data can be in a common language, or in different languages, as needed or desired. In an example of two different sets of regional product information data sharing a common language, each set can be provided in the English language, but a marketing name for the product my differ between the United States and the United Kingdom. In an example of two different sets of regional product information data having different languages, consider first regional product information data in the Chinese language, and second regional product information data in the Korean language.

Further, regional product information data 130 should be understood to include other product information similar to product information 135. Regional product information data 130 is searchable, such that a purchaser or user can obtain information related to the product associated with product information 115 based upon a search query that does not include a product identification for a particular product or service. Further note that product information 135 can include additional name and synonym information.

In a particular embodiment one or more of product name 140, category name 142, support name 144, solution name 146, of product name synonyms 148, category name synonyms 150, support name synonyms 152, and solution name synonyms 154 are determined based upon a product definition 160 that is provided by the entity that operates product description database 100, and that is provided for the region associated with regional product information data 130. For example, a regional marketing team can create one or more of product name 140, category name 142, support name 144, solution name 146, of product name synonyms 148, category name synonyms 150, support name synonyms 152, and solution name synonyms 154 based upon a regional preference, custom, or other consideration, as needed or desired.

In another embodiment one or more of product name 140, category name 142, support name 144, solution name 146, of product name synonyms 148, category name synonyms 150, support name synonyms 152, and solution name synonyms 154 are determined based upon various product knowledge 165 that is associated with the product, and that is available in the region associated with regional product information data 130. For example, product knowledge 135 can include a knowledge base for the entity that is available within the region, and that can be parsed for various names and synonyms that can be added to product information 135. In another example, product knowledge 165 can include various pieces of information that is associated with the product by third-parties outside of the entity, such as where a technology website provides a review of a particular product. This third-party information can be parsed for various names and synonyms that can be added to product information 135. In this way, product information 135 can be dynamically maintained and updated with recent trends, such as where the technology website applies a particular moniker to the product that becomes popular with time, such as "the competition killer," or other monikers that may become popular through viral Internet social media.

Figure 2:
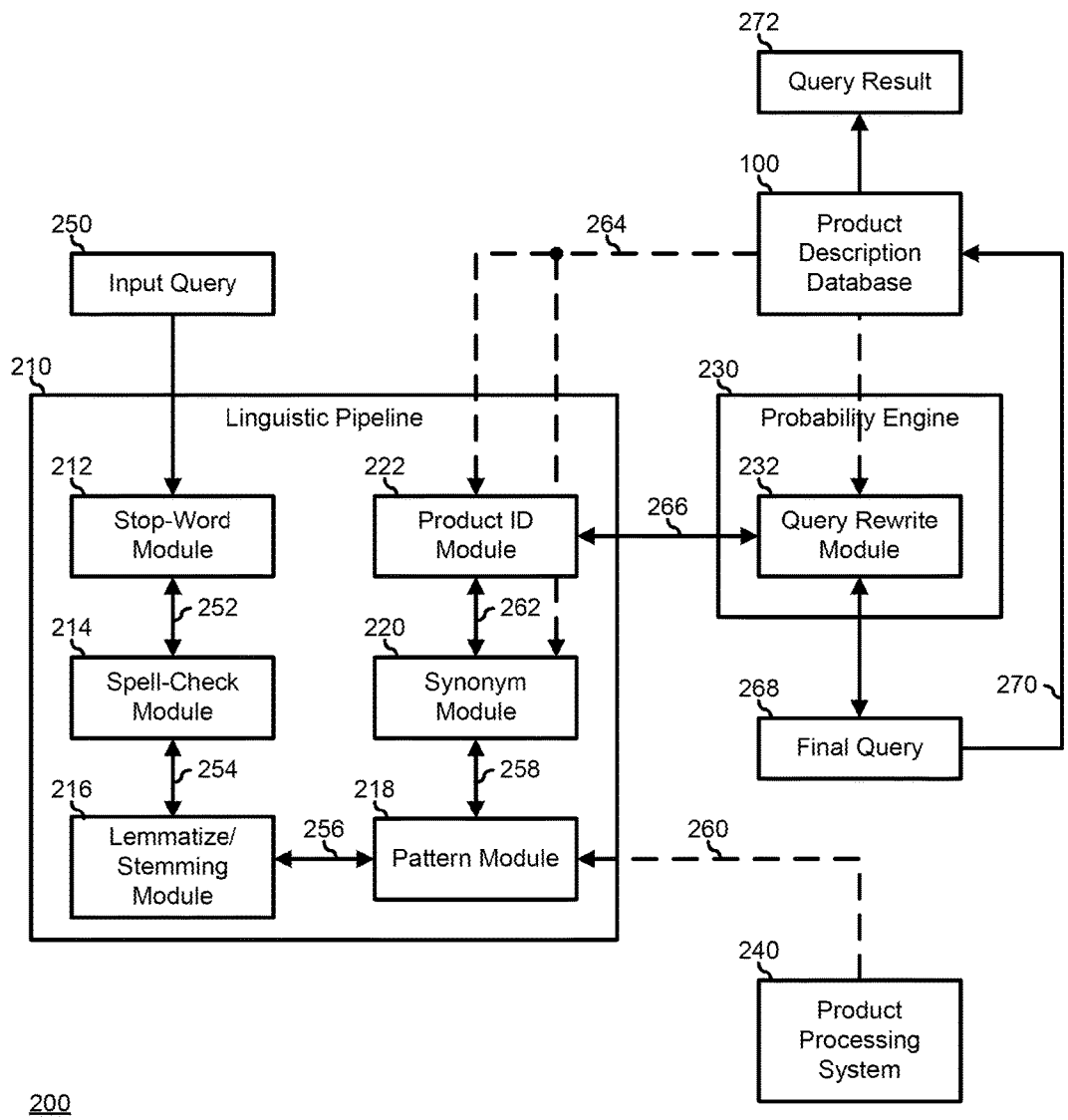
FIG. 2 is a block diagram of a product information query handler including the product description database of FIG. 1.

FIG. 2 shows a product information query handler 200, including a linguistic pipeline 210, a probability engine 230, an product processing system 100, and product description database 100. Product information query handler 200 represents a processing system that receives an input query 250 that is formed in various degrees of natural language, and that manipulates input query 250 into a final query 268 that is formed in terms of elements of global product information data 110. Final query 268 can then be provided as a search query to product description database 100, and the final query will represent an accurate interpretation of the searcher's intended search result.

Linguistic pipeline 210 represents a system or module that manipulates the natural language of input query 250 to determine the subject of the query, and where the intent may be unclear, to make a reasoned guess as to the subject of the query. Linguistic pipeline 210 includes a stop-word module 212, a spell-check module 214, a lemmatization and stemming module 216, a pattern detection module 218, a synonym module 220, and a product identification module 222. Stop-word module 212 operates to filter out common words that may be included in input query 250, but that convey little information as to the intent of the input query. Common stop-words include articles, short function words, and the like. For example, input query 250 can read "I want a 5 gb tablet computer with a 1 tb harddrive." Here, stop-word module 212 can identify various stop-words and modify input query 250 to read "want 5 gb tablet computer with 1 tb harddrive." Stop-word module 212 provides an intermediate query 252 to spell-check module 214.

Spell-check module 214 operates to identify and correct various misspellings within intermediate query 252. For example, intermediate query 252 can read "want 5 gb tablet computer with 1 tb harddrive," and spell-check module 214 can correct the intermediate query to read "want 5 gb tablet computer with 1 tb hard drive." Spell-check module 214 provides a next intermediate query 254 to lemmatization and stemming module 216.

Lemmatization and stemming module 216 operates to identify and modify or simplify various grammatical forms within intermediate query 254. Stemming refers to a heuristic process that chops off the ends of words within intermediate query 254 to simplify the search terms in the intermediate query. For example, where intermediate query includes the search terms "used laptops," lemmatization and stemming module 216 can modify the search terms to "use laptop." Lemmatization refers to a vocabulary and morphological analysis of words in intermediate query 254 with the aim to remove inflectional endings and to return a base or dictionary form of a word. For example, where intermediate query 254 includes a search term such as "is," "are," or "am," lemmatization and stemming module 216 can modify the search terms to "be." Lemmatization and stemming module 216 provides a next intermediate query 256 to pattern module 218.

Figure 3:
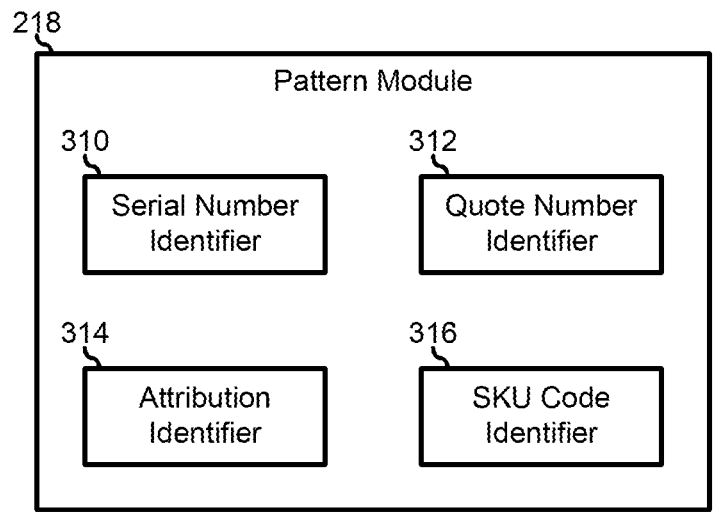
FIG. 3 is block diagram of a pattern module of the product information query handler of FIG. 2.

Pattern detection module 218 operates to identify and highlight various non-linguistic elements of intermediate query 256 that have special meanings within product information query handler 200. FIG. 3 illustrates an embodiment of pattern module 218, including a serial number identifier module 310, a quote number identifier module 312, and a Stock Keeping Unit (SKU) code identifier module 314. Serial number identifier module 310 operates to recognize an alpha-numeric pattern that represents a serial number for a product as may be provided during manufacturing of the product. Quote number identifier 312 operates to recognize an alpha-numeric pattern that represents a quote number for a product, as may be provided by a marketing group for the product to a customer. SKU code identifier module 314 operates to recognize an alpha-numeric pattern that represents a build SKU for a product, as may be provided by for various builds of the product. For example, a laptop with a hard drive from one manufacturer can be represented by a first SKU number, while a similar laptop with a same sized hard drive from a different manufacturer can be represent by a second SKU number.

Returning to FIG. 2, pattern detection module 218 operates to receive information 260 from order processing system 240 in order to identify and highlight the various non-linguistic elements of intermediate query 256. In particular, order processing system 240 represents various databases of the entity that provides the products, such as a manufacturing database that includes serial numbers and SKU information for the products, or an order processing database that includes quote number information for the product. Pattern module 218 provides a next intermediate query 258 to synonym module 220.

Synonym module 220 operates to identify and interpret various synonyms within intermediate query 258. For example, intermediate query 258 can read "want 5 gb tablet computer with 1 tb hard drive," and synonym module 220 can identify the synonym such as "laptop," or "2-in-1" for "tablet," and "disk drive," "solid state drive," or "memory" for "disk drive." In a particular embodiment, synonym module 220 receives information from product description database 100 related to what terms have synonyms, and what are the synonyms for those terms. Note that the operation of synonym module 220 can be to broaden the ultimate search results by adding synonyms that refer to multiple products. Synonym module 220 provides a next intermediate query 262 to product identification module 222.

Figure 4:
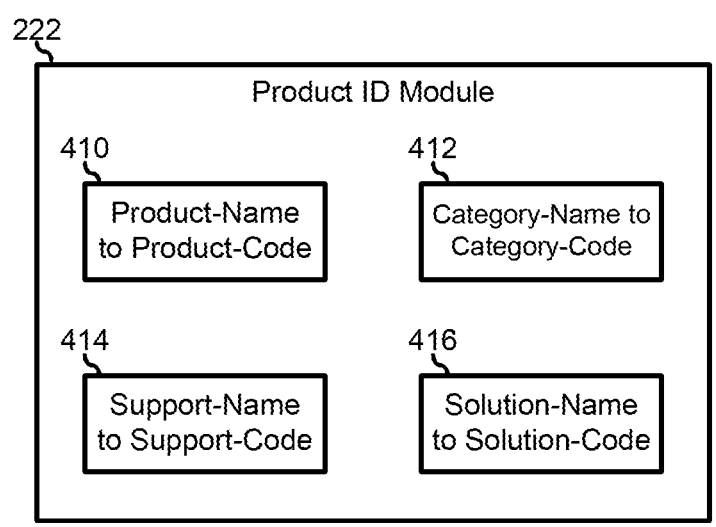
FIG. 4 is a block diagram of a product identification module of the product information query handler of FIG. 2.

Product identification module 222 operates to identify and highlight various products from product description database 100. FIG. 4 illustrates an embodiment of product identification module 222, including a product-name to product-code module 410, a category-name to category-code module 412, a support-name to support-code module 414, and a solution-name to solution-code module 416. Each name-to-code module 410, 412, 414, and 416 operates to identify names of products, categories, support items, and solution items, respectively, in intermediate query 262 and to map the various names to the associated codes. Returning to FIG. 2, product identification module 222 operates to receive information 264 from order processing system 240 in order to identify and highlight the various products from the product description database as found in intermediate query 256. Product identification module 222 provides a next intermediate query 266 to probability engine 230.

Probability engine 230 operates to analyze intermediate query 266 in terms of probabilities and heuristics that may provide insight into the intentions embodied in input query 250. As such, probability engine 230 provides dynamic scoring of the search terms included in intermediate query 266 to better gage the intent of input query 250. For example, intermediate query 266 can include a product code for an obsolete product, and another product code for a hot-selling product. Here, probability engine 230 can downgrade the likelihood that the intent of the search was for an obsolete product, and can upgrade the likelihood that the intent of the search was for the hot-selling product. Probability engine 230 includes a query rewrite module 232 which receives intermediate query 266 and, based upon the analysis of the intermediate query, provides 270 final query 268 to product description database to return a query result 272. Query result 272 can include a listing of the various products that match final query 268, a long with links to other product information related to the various products.

By having two or more regional product information data sets associated with the global product information data, product information query handler 200 permits input query 250 to be provided in a mixed language format. For example, where a Chinese language speaker knows of a product name in English, the speaker fan fashion a query that includes the English product name, and can also include specification details that are written in the Chinese language. Here, even though the input query is provided in a mixed language format, the query will result in the same information as would be provided by a single language formatted query. In a particular embodiment, linguistic pipeline 210 includes other modules as needed or desired. Further, the order in which modules 212, 214, 216, 218, 220, and 222 operate, a shown in FIG. 2 is exemplary, and the order can be modified as needed or desired.

Figure 5:
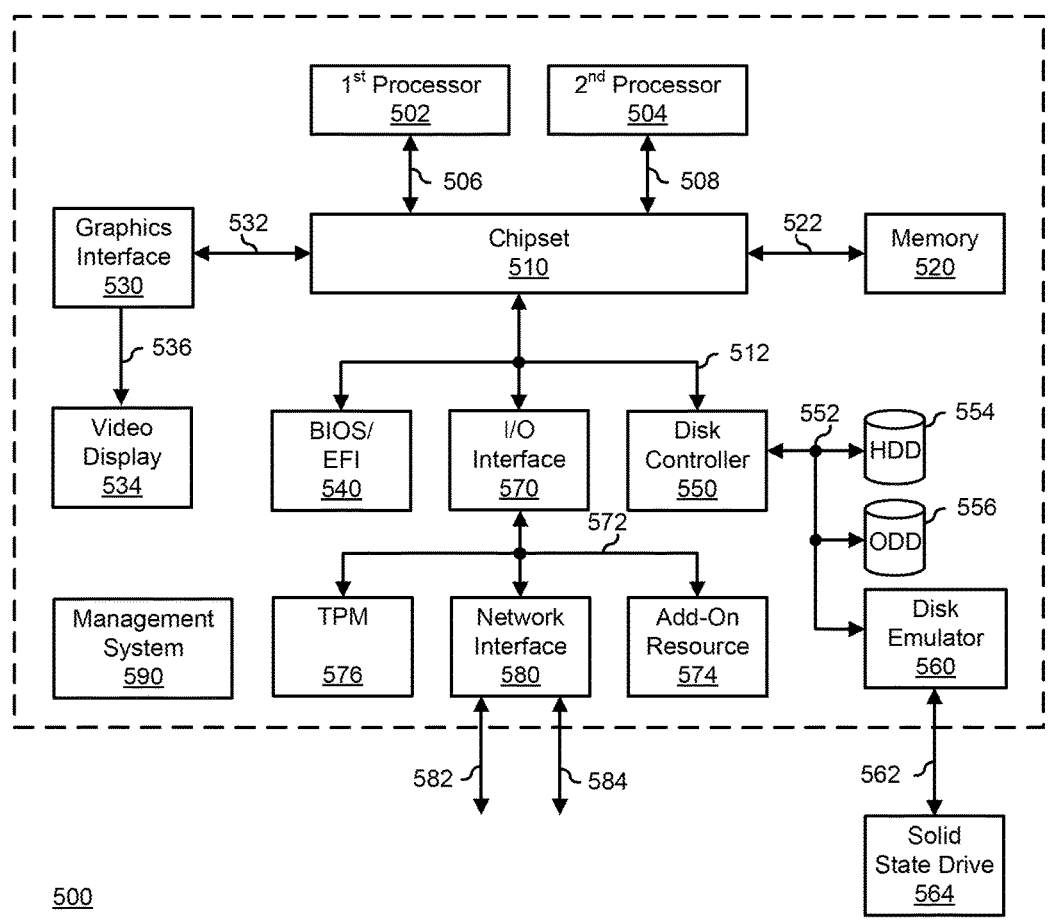
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, a network interface 580, and a management system 590. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management controller 590 provides for out-of-band monitoring, management, and control of the respective elements of information handling system 500, such as cooling fan speed control, power supply management, hot-swap and hot-plug management, firmware management and update management for system BIOS or UEFI, Option ROM, device firmware, and the like, or other system management and control functions as needed or desired. As such, management system 590 provides some or all of the functions and features of the management systems described herein.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
    receiving, at a query handling system, a query;
    determining that the query includes a first query term associated with a first product, wherein the first query term is in a first language, and wherein the first product is identified by a first product code;
    substituting the first product code for the first query term in an intermediate query;
    determining that the query includes a second query term associated with a second product, wherein the second query term is in a second language different from the first language, and wherein the second product is identified by a second product code;
    substituting the second product code for the second query term in the intermediate query; and
    searching a product information database based upon the intermediate query.

2. The method of claim 1, further comprising:
    providing a search result in response to searching the product information database, wherein the search result includes the first product, and the second product.

3. The method of claim 2, further comprising:
    analyzing the search result to determine an intention embodied by the query; and
    providing a final result in response to the analyzing.

4. The method of claim 3, wherein in analyzing the search result, the method further comprises:
    determining that the first product is a newer product than the second product.

5. The method of claim 4, wherein the final result includes the first product in response to determining that the first product is the newer product.

6. The method of claim 5, wherein the final result further excludes the second product in response to determining that the first product is the newer product.

7. A non-transitory computer-readable medium including code for performing a method, the method comprising:
    receiving a query;
    determining that the query includes a first query term associated with a first product, wherein the first query term is in a first language, and wherein the first product is identified by a first product code;
    substituting the first product code for the first query term in an intermediate query;
    determining that the query includes a second query term associated with a second product, wherein the second query is in a second language different from the first language, and wherein the second product is identified by a second product code;
    substituting the second product code for the second query term in the intermediate query; and
    searching a product information database based upon the intermediate query.

8. The computer-readable medium of claim 7, the method further comprising:
    providing a search result in response to searching the product information database, wherein the search result includes the first product and the second product.

9. The computer-readable medium of claim 8, the method further comprising:
    analyzing the search result to determine an intention embodied by the query; and
    providing a final result in response to the analyzing.

10. The computer-readable medium of claim 9, wherein in analyzing the search result, the method further comprises:

determining that the first product is a newer product than the second product.

11. The computer-readable medium of claim 10, wherein the final result includes the first product in response to determining that the first product is the newer product.

12. The computer-readable medium of claim 11, wherein the final result further excludes the second product in response to determining that the first product is the newer product.

13. A query handling system, comprising:
a product information database; and
a linguistic pipeline module that:
receives a query;
determines that the query includes a first query term associated with a first product, wherein the first query term is in a first language, and wherein the first product is identified by a first product code;
substitutes the first product code for the first query term in a first intermediate query;
determines that the query includes a second query term associated with a second product, wherein the second query is in a second language different from the first language, and wherein the second product is identified by a second product code;
substitutes the second product code for the second query term in the intermediate query; and
searches the product information database based upon the intermediate query.

14. The query handling system of claim 13, wherein the product information database further:
provides a search result in response to searching the product information database, wherein the search result includes the first product and the second product.

15. The query handling system of claim 14, further comprising:
a probability module that analyzes the search result to determine an intention embodied by the query, and that provides a final result in response to the analyzing.

16. The query handling system of claim 15, wherein in analyzing the search result, the probability module further determines that the first product is a newer product than the second product.

17. The query handling system of claim 16, the method further comprising:
analyzing the search result to determine an intention embodied by the query; and
providing a final result in response to the analyzing.

18. The query handling system of claim 17, wherein the final result further excludes the second product in response to determining that the first product is the newer product.

* * * * *